United States Patent
Noveck et al.

(10) Patent No.: US 6,757,695 B1
(45) Date of Patent: Jun. 29, 2004

(54) SYSTEM AND METHOD FOR MOUNTING AND UNMOUNTING STORAGE VOLUMES IN A NETWORK STORAGE ENVIRONMENT

(75) Inventors: David B. Noveck, Lexington, MA (US); Raymond C. Chen, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 439 days.

(21) Appl. No.: 09/925,919

(22) Filed: Aug. 9, 2001

(51) Int. Cl.[7] .............................................. H06F 17/30
(52) U.S. Cl. ...................................... 707/200; 707/101
(58) Field of Search .......................... 707/8, 102, 205; 710/8, 19, 302; 711/114, 118, 156; 714/4, 6

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,363,487 A | * 11/1994 | Willman et al. ................ | 710/8 |
| 5,485,579 A | 1/1996 | Hitz et al. | |
| 5,497,457 A | * 3/1996 | Ford ............................. | 714/6 |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | * 9/1999 | Hitz et al. ..................... | 714/6 |
| 5,950,225 A | 9/1999 | Kleiman | |
| 5,963,962 A | 10/1999 | Hitz et al. | |
| 5,999,930 A | * 12/1999 | Wolff ............................ | 707/8 |
| 6,038,570 A | 3/2000 | Hitz et al. | |
| 6,052,692 A | * 4/2000 | Anderson et al. ............ | 707/102 |
| 6,065,037 A | 5/2000 | Hitz et al. | |
| 6,119,244 A | * 9/2000 | Schoenthal et al. ............ | 714/4 |
| 6,138,126 A | 10/2000 | Hitz et al. | |
| 6,425,035 B2 | 7/2002 | Hoese et al. | |

OTHER PUBLICATIONS

U.S. Pending patent application entitled, Manipulation of Zombie Files and Evil–Twin Files, Ray Chen et al., Ser. No. 09/642,066, Filed: Aug. 18, 2000, all pages.

U.S. Pending patent application entitled, Operator Initiated Graceful Takeover in a Node Cluster, Cramer et al., Ser. No. 09/933,866, Filed: Aug. 20, 2001, all pages.

* cited by examiner

*Primary Examiner*—Diane D. Mizrahi
*Assistant Examiner*—Apu Mofiz
(74) *Attorney, Agent, or Firm*—Cesari and McKenna, LLP (57) ABSTRACT

A system and method for mounting and unmounting volumes attached to a data storage system, such as a file server, tracks specific sub-states within each of the overall mounting and unmounting procedure states, in which specific file system requests are and are not allowed (as appropriate) with respect to the mounting/unmounting volume based upon the sub-state. More specifically, for mounting or unmounting, a storage operating system in the file server transitions a volume through a series of sub-states, as tracked in appropriate control structures. Each sub-state is characterized by a set of permitted operations that may be performed while the volume is in that sub-state, entrance and exit criteria for that sub-state, and restricted operations that may not be performed while the volume is that sub-state. During transaction request handling, the storage operating system validates each request against the sub-state to determine the disposition of the request. Then, depending on the request and the sub-state, the storage operating system will execute the request, ignore the request, hold the request for later execution, or return an error message to the client originating the request.

24 Claims, 8 Drawing Sheets

SYSTEM AND METHOD FOR MOUNTING AND UNMOUNTING STORAGE VOLUMES IN A NETWORK STORAGE ENVIRONMENT

FIELD OF THE INVENTION

This invention relates to network storage systems, and more particularly to data storage systems including file servers for managing a number of attached storage volumes.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a storage system that implements file system semantics (such as the above-referenced WAFL) and manages data access. In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

More than one filer can reside on a single network (LAN, WAN, etc.), for access by network-connected clients and servers. Where multiple filers are present on the network, each filer may be assigned responsibility for a certain set of volumes. The filers may be connected in a cluster using a separate physical interconnect or linking communication protocol that passes over the network (e.g. the LAN, etc.). In the event of a failure or shutdown of a given filer, its volume set can be reassigned to another filer in the cluster to maintain continuity of service. In the case of an unscheduled shutdown, various failover techniques are employed to preserve and restore file service, as described generally in commonly owned U.S. patent application Ser. No. 09/933, 866 entitled GRACEFUL TAKEOVER IN A NODE CLUSTER by Naveen Bali et al, the teachings of which are expressly incorporated herein by reference. Such techniques involve (a) the planned and unplanned takeover of a filer's volumes by a cluster partner filer upon filer shutdown; and (b) the giveback of the taken-over volumes to the original filer upon reinitialization of the downed-filer. A management station can also reside on the network, as a specialized client that includes storage management software used by a system administrator to manipulate and control the storage-handling by networked filers.

A filer can be made more reliable and stable in the event of a system shutdown or other unforeseen problem by employing a backup memory consisting of a non-volatile random access memory NVRAM as part of its architecture. An NVRAM is typically a large-volume solid-state memory array (RAM) having either a backup battery, or other built-in last-state-retention capabilities (e.g. a FLASH memory), that holds the last state of the memory in the event of any power loss to the array.

In a known implementation, as a client transaction request is completed by the storage operating system, that request is logged to the NVRAM as a journal entry. The NVRAM is loaded with requests until such time as a consistency point (CP) is reached. CPs occur at fixed time intervals, or when other key events arise. Each time a CP occurs, the requests logged in the NVRAM are subsequently overwritten once the results of the requests are written from the filer's conventional RAM buffer cache to disk. This is because once a root inode is written from cache to the disk, then the logged data in the NVRAM is no longer needed, and it may be overwritten or otherwise cleared. Immediately thereafter, the NVRAM is available for the logging of new requests. The process continues as each CP occurs, at which time the entry count of the NVRAM log is reset (allowing overwrite), and cached results of client requests are transferred to disk. In general, the NVRAM log is replayed to re-perform any requests logged therein for its own filer (and an associated cluster partner filer, if any) between the last CP and an interruption in storage handling. In addition, the log is replayed during reboot.

In the event of an unexpected shutdown, power failure or other system problem, which interrupts the normal flow of information among the client, storage operating system, and the disks, the NVRAM can be used to recover information logged since the last CP prior to the interruption event Having discussed typical filer components and operation, we now turn to the transitioning of volumes. The physical disks of a volume may need to be taken offline (i.e., "unmounted"), in which state the associated files system is not allowed to access data on the volume's disks. Subsequently, the disks may be brought back online (i.e., "mounted") with that filer, or another differing filer, in which state the associated file system is again allowed to access the data on the disks. This process of mounting and/or unmounting the volume can occur for a variety of reasons. For example, when the filer is serviced, an unmount/mount may occur. Servicing of a particular disk within the overall volume disk array may require unmounting. Moreover, unmounting is involved whenever a filer (or the overall filer cluster) is gracefully shut down or rebooted. Mounting is also a required process in the above-described failover scenario, whereby the storage previously managed by a failed or otherwise unavailable filer is subsequently remounted in association with the cluster partner filer, while unmounting is required as part of giveback process when the storage taken over by a cluster partner is unmounted so that it can be made available to the filer normally responsible for managing it.

In general, prior art processes for transitioning of volumes between mounted and unmounted states involve the use of a specific control thread that does not make information regarding the mounted and unmounted states available (or recorded) externally to that control thread. In other words, other procedures in the overlying file system may not have knowledge of the particular stage of mount or unmount currently existing with respect to the transitioning volume because the mount/unmount control thread is isolated from other control threads within the file system.

One commonly employed technique to facilitate a graceful mount and unmount of a volume entails the taking-offline and subsequent reboot of the attached filer. However, as the size of attached storage volumes increases radically for a given filer, mounting or unmounting a volume by completely rebooting a filer becomes highly undesirable and leads to potential unavailability of an extensive quantity of data. Additionally, the growth in the number of volumes attached to a given filer makes the problem of isolated control threads of greater concern. This is because various file system control threads may need to be invoked during various stages of the mounting/unmounting process (such as filer failover procedures). The file system needs to "know" when to invoke such system procedures/requests. In the past, flag bits in predetermined control structures were set to indicate the volume mounting and unmounting states. However, this approach is cumbersome, and is susceptible to errors when new or different control threads are introduced (e.g. upgrades and repairs)—and for which no flag bits have been provided by the file system procedures.

In one example, procedures that operate continuously and in background, such as the daemon for elimination of so-called "zombie" files (e.g. large files that exist on-disk), but that are no longer needed, must be terminated or they will continue to interact with disks. This interaction may prevent unmount, as requests to the unmounting volume never cease. The delete operation is described in co-pending and commonly-assigned U.S. patent application Ser. No. 09/642,066, entitled MANIPULATION OF ZOMBIE FILES AND EVIL-TWIN FILES, by Ray Chen et al., which application is hereby incorporated by reference. In addition, clients/users connected through the Common Internet File System (CIFS) protocol require notification to cleanly break their logical connection with the filer, and thus to cease the continuous provision of requests to the file system for is the unmounting volume.

Likewise certain "exogenous" file system procedures/requests may be harmful during particular stages of the mount/unmount process, and need to be avoided. In order to ensure that a volume may mount or unmount "gracefully," and without system failure, the progressive control of file system requests during unmounting and mounting and is desired.

It is, therefore, an object of this invention to provide a system and method within the overall file system architecture for ensuring that volume mounting and unmounting occurs gracefully, with desired file system requests being allowed, and with undesired exogenous requests being restricted, during mount and unmount. This system and method should also allow file system procedures to be readily added, deleted or modified in relative isolation from the mounting and unmounting procedure, while still ensuring that mounting and unmounting always occurs gracefully.

SUMMARY OF THE INVENTION

This invention overcomes the disadvantages of the prior art by providing a system and method for mounting and unmounting volumes attached to, managed by, or part of, a storage system, such as a file server, by tracking (with an appropriate mechanism in the storage operating system) specific sub-states within each of the overall mounting and unmounting procedure states, in which specific file system operations (such as requests) are selectively permitted or restricted (as appropriate) with respect to the mounting/unmounting volume based upon the sub-state.

More specifically, for mounting or unmounting, the storage operating system transitions a volume through a series of sub-states, as tracked in appropriate control structures.

Each sub-state is characterized by a set of permitted operations that may be performed while the volume is in that sub-state, entrance and exit criteria for that sub-state, and restricted operations that may not be performed while the volume is that sub-state. During transaction request handling, the storage operating system validates each request against the sub-state to determine the disposition of the request. Then, depending on the request and the sub-state, the storage operating system will either execute the request, ignore the request, hold the request for later execution, or return an error message to the client originating the request. Typically, the restrictions on requests for mounting become less as the volume nears a mounted state, and the reverse is true as the volume nears an unmounted state. Thus, these sub-states regulate activities such as request processing to the volumes and the draining of remaining unfinished processes as well as the shutdown or isolation of the volume from long-term processes such as defragmentation and other file maintenance utilities that act upon the volume's files.

According to a preferred embodiment, the storage operating system encodes the sub-states in control blocks or structures associated with the file system. Each volume is associated with an overall state, including a VOLUME MOUNTING state and a VOLUME UNMOUNTING state, which each define, respectively, progress toward final mount or unmount. The VOLUME MOUNTING state has specific sub-states at which various file system activities are permitted or rejected with respect to the subject volume, and the VOLUME UNMOUNTING state has other specific sub-states at which certain file system activities are permitted or rejected with respect to the subject volume.

For the VOLUME MOUNTING overall state, the sub-states include, in order of progression: (a) LOADING, in which generally only file system requests devoted to reading meta-data from the volume are permitted and other exogenous requests are rejected; (b) INITIALIZING, in which internal files needed for the mounting procedure, but not part of the volume meta-data, are initialized, and other requests are rejected; and (c) FINAL, in which initialization of the file system with respect to the mounted volumes has been completed, but the volume may not be ready to respond to external file system requests, due to the needed replay of an NVRAM log. In one embodiment, volumes may be directed to mount individually using a "volume online" command by an operator, or as a group, based upon a reboot of a filer or takeover of volumes owned by an interconnected cluster partner filer.

For the VOLUME UNMOUNTING overall state, the sub-states include, in order of progression: (a) PREPARE, in which all file system requests are handled normally, but no changes to the volume data can be made other than those required to unmount the volume; (b) REFERENCE DRAIN (for unmounting individual volumes) or GIVEBACK DRAIN (for giveback from a cluster partner filer to a volume owner-filer), in which the external procedures/requests referencing the volume ("volume references") are allowed to complete, while no new volume references or other requests for the volume are permitted; (c) DRAIN, in which all active file system requests (possibly restarted after suspension) are processed to completion. No new file system requests other than certain specified native requests (such as, for example, CP-related requests) are permitted (e.g. specifically no exogenous requests); (d) WAIT, in which internal, long term processes, such as Zombie processing are terminated and new file system requests and most internal requests are rejected; and (e) FINAL, in which data structures storing the file system state are released. The file system may, according to one embodiment, perform a plurality of consistency point operations to clear any remaining requests related to the unmounted volumes from NVRAM.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

A. Networks and File Servers

Figure 1:
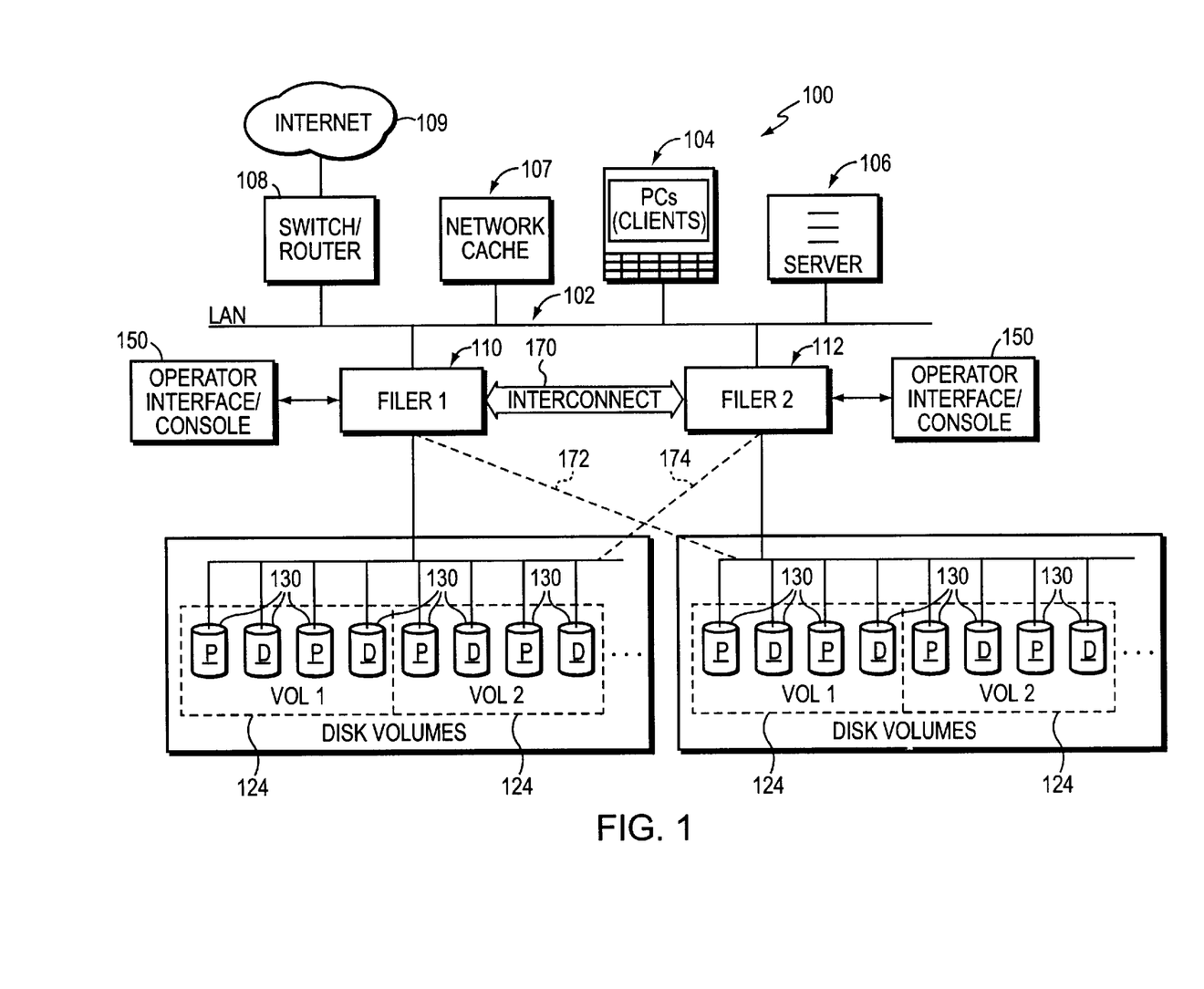
FIG. 1 is a schematic block diagram of a network environment including various networked devices including exemplary file servers and associated volumes according to an embodiment of this invention.

FIG. 1 is a schematic block diagram of an exemplary network environment 100 in which the principles of the present invention are implemented. The network 100 is based around a local area network (LAN) interconnection 102. However, a wide area network (WAN), virtual private network (VPN) implementation (utilizing communication links over the Internet, for example), or a combination of LAN, WAN and VPN implementations can be established. For the purposes of this description, the term "LAN" should be taken broadly to include any acceptable networking architecture. The LAN 102 interconnects various clients based upon personal computers (PCs) 104, servers 106 and a network cache 107. Also interconnected to the LAN may be a switch/router 108 that provides a gateway to the well-known Internet 109, thereby enabling various networked devices to transmit and receive internet based information, including e-mail, web content, and the like.

In addition exemplary file servers (or "filers") 110 and 112 (Filer 1 and Filer 2, respectively) are connected to the LAN. These filers, (described further below) are configured to control storage of, and access to, data in a set of interconnected storage volumes 124. As described further below, each volume is typically organized to include one or more RAID groups of physical storage disks 130 (also designated as parity P and data D) for increased data storage integrity and reliability.

Each of the devices attached to LAN include an appropriate, conventional network interface arrangement (not shown) for communicating over the LAN using desired communication protocols, such as the well-known Transport Control Protocol/Internet Protocol (TCP/IP), User Datagram Protocol (UDP), Hypertext Transfer Protocol (HTTP) or Small Network Management Protocol (SNMP).

Note that the teachings of this invention can be adapted to a variety of storage system architectures including, but not limited to, a network-attached storage environment, a storage area network and disk assembly directly-attached to a client/host computer. The term "storage system" should therefore be taken broadly to include such arrangements. It is expressly contemplated that the various processes, architectures and procedures described herein can be implemented in hardware, firmware or software, consisting of a computer-readable medium including program instructions that perform a series of steps.

Note that each filer can also be provided with a graphical user interface/console 150 so that instructions from an operator can be entered directly to the filer while generally bypassing the LAN or other network.

Figure 2:
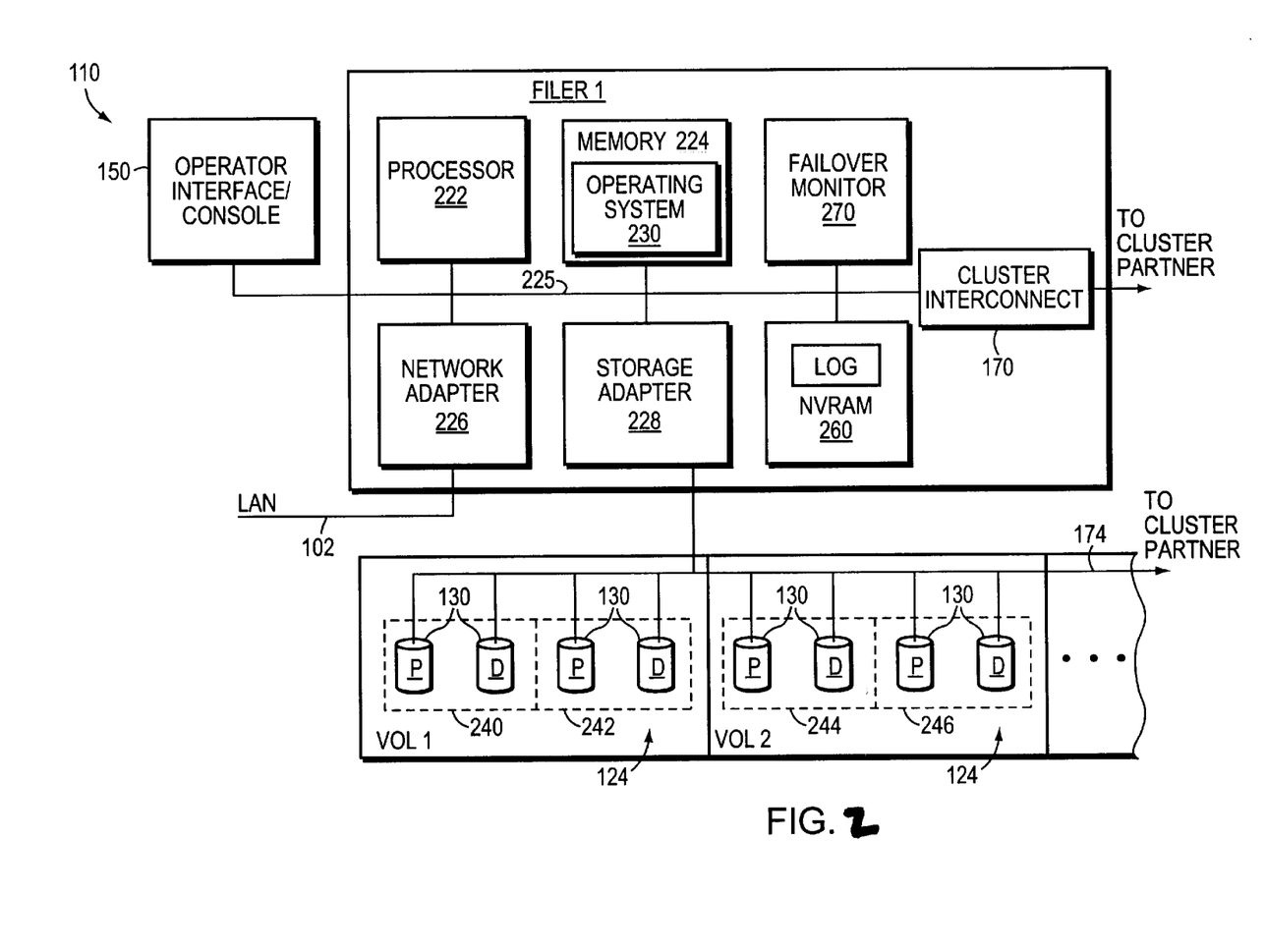
FIG. 2 is a more-detailed schematic block diagram of an exemplary file server in accordance with FIG. 1.

An exemplary filer architecture is now described in further detail. FIG. 2 is a more-detailed schematic block diagram of the exemplary file server 110 (Filer 1) implemented as a network storage appliance, such as the NetApp® filer available from Network Appliance, that can execute the above-described Data ONTAP software and is advantageously used with the present invention. Other filers can have similar construction (including exemplary Filer 2 112). By way of background, a network storage appliance is a special-purpose computer that provides file service relating to the organization of information on storage devices, such as disks. However, it will be understood by those skilled in the art that the inventive concepts described herein may apply to any type of filer whether implemented as a special-purpose or general-purpose computer, including a standalone computer. The filer 110 comprises a processor 222, a memory 224, a network adapter 226 and a storage adapter 228 interconnected by a system bus 225. The filer 110 also includes a storage operating system 230 that implements a file system to logically organize the information as a hierarchical structure of directories and files on the disks.

In the illustrative embodiment, the memory 224 may have storage locations that are addressable by the processor and adapters for storing software program code and data structures associated with the present invention. The processor and adapters may, in turn, comprise processing elements and/or logic circuitry configured to execute the software code and manipulate the data structures. The storage operating system 230, portions of which are typically resident in memory and executed by the processing elements, functionally organizes the filer 110 by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the filer 110 to a client 104 (including, for example, but not limited to, management station 140) (see FIG. 1) over the computer network (LAN 102), which, as described generally above, can comprise a point-to-point connection or a shared medium, such as a local area network. A client (104, 140) can be a general-purpose computer configured to execute applications including file system protocols, such as the Common Internet File System (CIFS) protocol. Moreover, the client can interact with the filer 110 in accordance with a client/server model of information delivery. That is, the client may request the services of the filer, and the filer may return the results of the services requested by the client, by exchanging packets that conform to, e.g., the CIFS protocol format over the network 102. The format of the CIFS protocol packet exchanged over the network is well-known and described in *Common Internet File System (CIFS) Version. CIFS-Spec* 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein.

The storage adapter 228 cooperates with the storage operating system 230 executing on the filer to access information requested by the client, which information may be stored on a number of storage volumes 124 each constructed from an array of physical disks that are organized as RAID groups 240, 242, 244 and 246. The RAID groups include independent physical disks including those storing striped data (D) and those storing separate parity (P) for the data, in accordance with a preferred RAID 4 configuration. However, other RAID configurations (e.g. RAID 5) are also contemplated. In this embodiment, a minimum of one parity disk and one data disk is employed. However, a typical implementation may include three data and one parity disk per RAID group and a multiplicity of RAID groups per volume.

The storage adapter 228 includes input/output (I/O) interface circuitry that couples to the disks over an I/O interconnect arrangement, such as a conventional high-performance, Fibre Channel serial link topology. The information is retrieved by the storage adapter 228 and, if necessary, processed by the processor 222 (or the adapter 228 itself) prior to being forwarded over the system bus 125 to the network adapter 126, where the information is formatted into a packet and returned to the client 110.

Notably, the exemplary filer 110 includes an NVRAM 260 that provides fault-tolerant backup of data, enabling the integrity of filer transactions to survive a service interruption based upon a power failure, or other fault. The NVRAM 260 is typically made sufficiently large to log a certain time-based chunk of transactions (for example, several seconds worth). The NVRAM entry may be constructed in parallel with execution of the corresponding request, once it is determined that a request will be successfully performed but it must be completed (as must any copying to mirror NVRAM of the partner in a cluster configuration) before the result of the request is returned to the requesting client.

In addition, each filer 110,112 includes a failover monitor 270. Briefly, the failover monitor in each filer facilitates takeover of one or more volumes of the attached storage of a cluster partner filer (e.g. Filer 2 112). Communication between cluster partners occurs through the cluster interconnect 170 (FIG. 1) and via a respective direct loop cross-connection (dashed lines 172, 174 in FIG. 1) between each partner filer and the other partner's attached volume set. The NVRAM of each cluster partner is divided so as to store file system requests with respect to the partner as well as its own. This arrangement is described in further detail in connection with the above referenced GRACEFUL TAKEOVER IN A NODE CLUSTER.

B. Storage Operating System

The storage operating system 230 implements a file system that logically organizes information as a hierarchical structure of directories and files on the disks. Each "on-disk" file may be implemented as set of disk blocks configured to store information, such as text, whereas the directory may be implemented as a specially formatted file in which other files and directories are stored. In the illustrative embodiment described herein, the storage operating system 230 associated with each volume is, for example, the NetApp® Data ONTAP™ operating system available from Network Appliance, Inc. of Sunnyvale, Calif. that implements a Write Anywhere File Layout (WAFL) file system. The preferred storage operating system for the exemplary filer is now described briefly. However, it is expressly contemplated that the principles of this invention can be implemented using a variety of alternate storage operating system architectures.

Figure 3:
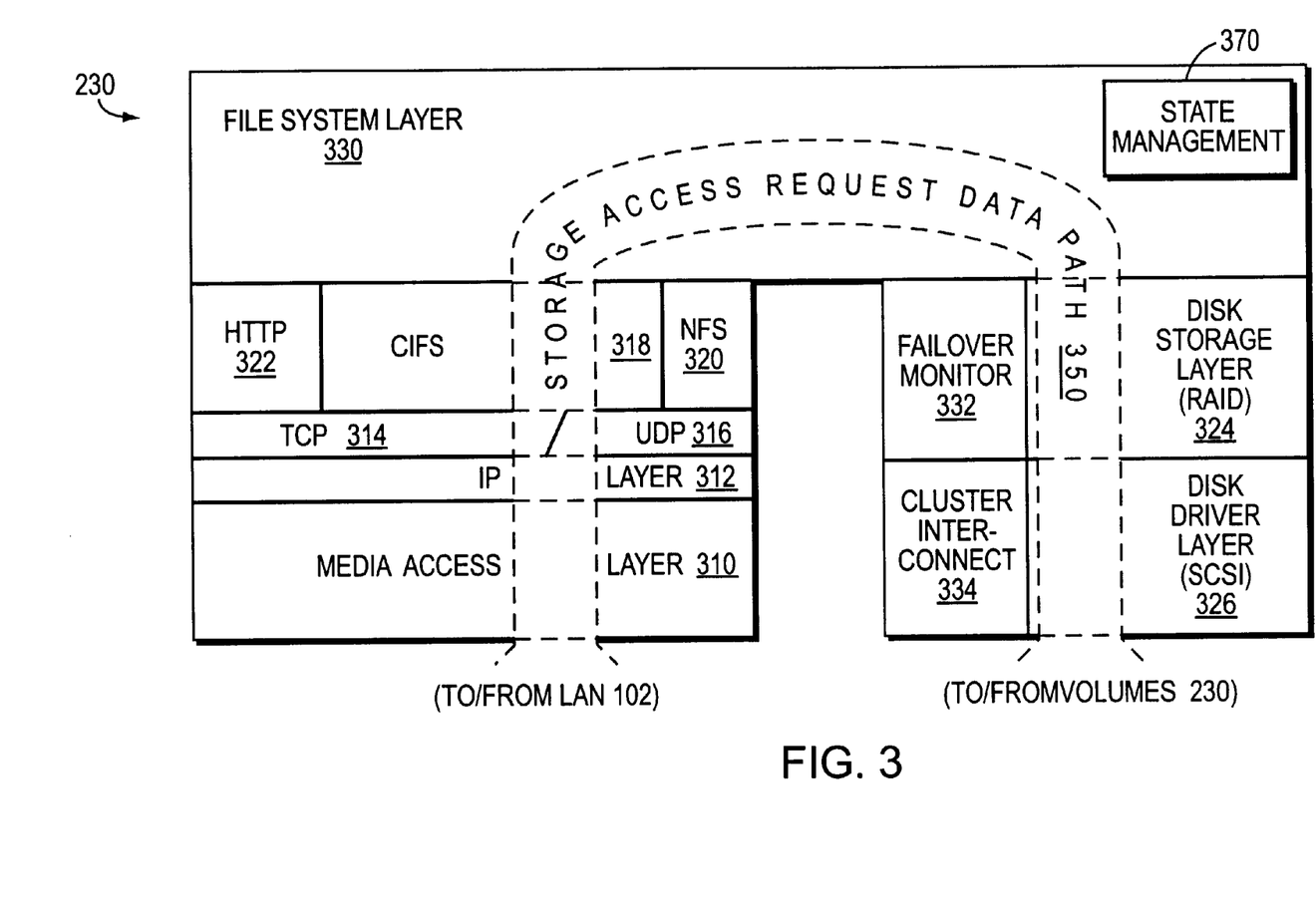
FIG. 3 is a schematic block diagram of an operating system for use with the exemplary file servers of FIG. 2 according to an embodiment of this invention.

As shown in FIG. 3, the storage operating system 230 comprises a series of software layers, including a media access layer 310 of network drivers (e.g., an Ethernet driver). The storage operating system 230 further includes network protocol layers, such as the IP layer 312 and its TCP layer 314, and UDP layer 316. A file system protocol layer 318 provides multi-protocol data access and, to that end, includes support for the CIFS protocol, the Network File System (NFS) protocol 320 and the HTTP protocol 322. In addition, the storage operating system 230 includes a disk storage layer 324 that implements a disk storage protocol, such as a RAID protocol, and a disk driver layer 326 that implements a disk access protocol such as, e.g., a Small Computer Systems Interface (SCSI) protocol.

Bridging the disk software layers with the network and file system protocol layers is a file system layer 330 of the storage operating system. Generally, the layer 330 implements a file system having an on-disk format representation that is block-based using, e.g., 4-kilobyte (KB) data blocks and using inodes to describe the files. In response to transaction requests, the file system generates operations to load (retrieve) the requested data from volumes 124 if it is not resident "in-core", i.e., in the filer's memory 224. If the information is not in memory, the file system layer 330 indexes into the inode file using the inode number to access an appropriate entry and retrieve a logical volume block number. The layer 330 then passes the logical volume block number to the disk storage (RAID) layer 324, which maps that logical number to a disk block number and sends the latter to an appropriate driver (for example, an encapsulation of SCSI implemented on a fibre channel disk interconnection) of the disk driver layer 326. The disk driver accesses the disk block number from volumes 124 and loads the requested data in memory 224 for processing by the filer 110. Upon completion of the request, the filer (and storage operating system) returns a reply, e.g., a conventional acknowledgement packet defined by the CIFS specification, to the client 104, 140 over the network 102.

The transaction requests to which the file system layer responds may be of either of two types: "native" and "exogenous". As used herein, the term "native" shall refer generally to requests that originate in the file system component of the storage operating system. As used herein, the term "exogenous" shall refer generally to requests and procedures that are received from clients on the network using one of the supported protocols (e.g. NFS and CIFS) or that, while generated on the filer itself, are outside of the file system component of the storage operating system.

It should be noted that the software "path" 350 through the storage operating system layers described above needed to perform data storage access for the client request received at the filer may alternatively be implemented in hardware or a combination of hardware and software.

The storage operating system 230 has additional software layers, such as cluster interconnect layer 334 for controlling the operation of the cluster interconnect link between Filers 1 and 2 in FIG. 1. A failover monitor layer 332 controls the operation of the failover monitor 170. The failover monitor layer also controls storing such information in the NVRAM, storing a mirror image copy of the information in the NVRAM of its partner, and controlling other communications between Filers 1 and 2. In addition, an open firmware layer is preferably disposed over the Basic Input/Output System (BIOS) (not shown) of each filer's storage operating system, and it can change boot environment variables to thereby change the way a filer boots. This is advantageous during a reboot.

C. File System (FS) Control Structure and Volume Control Structure

Figure 4:
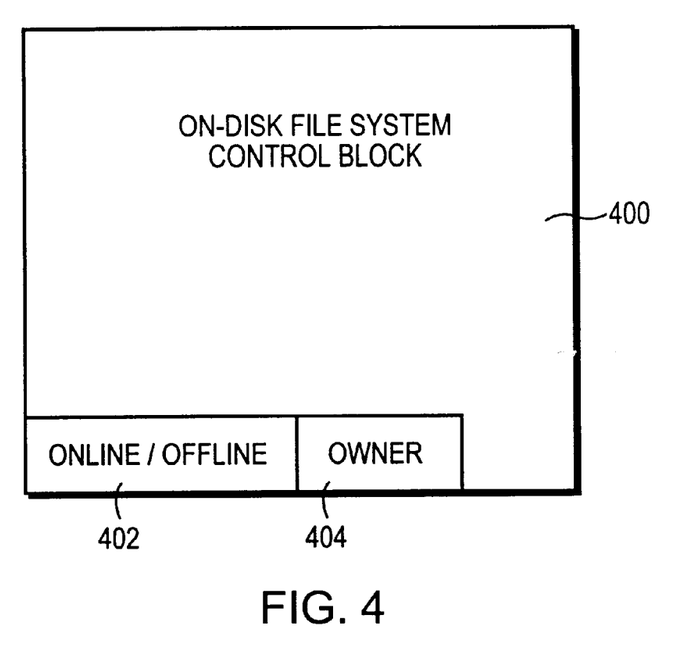
FIG. 4 is a simplified block diagram of an on-disk file system control block.

As noted generally above, an on-disk FS control structure or "block" (meta-data) is stored at a known location on each volume. As detailed in FIG. 4, this block 400 contains basic "state" information 402 related to whether the volume is currently "online" or "offline." The block also contains ownership information 404 identifying the filer that currently "owns" (e.g. manages) the volume. This owner can be the attached filer or the cluster partner in one embodiment. The file system control structure 500 can store the state and other information in the form of variable values, field entries, flags, either within the structure, referenced by the structure, or otherwise associated with the structure. The FS control block does not typically include "transitional" state information. That is, the current progress of a volume toward mounting or unmounting is not stored on-disk.

Figure 5:
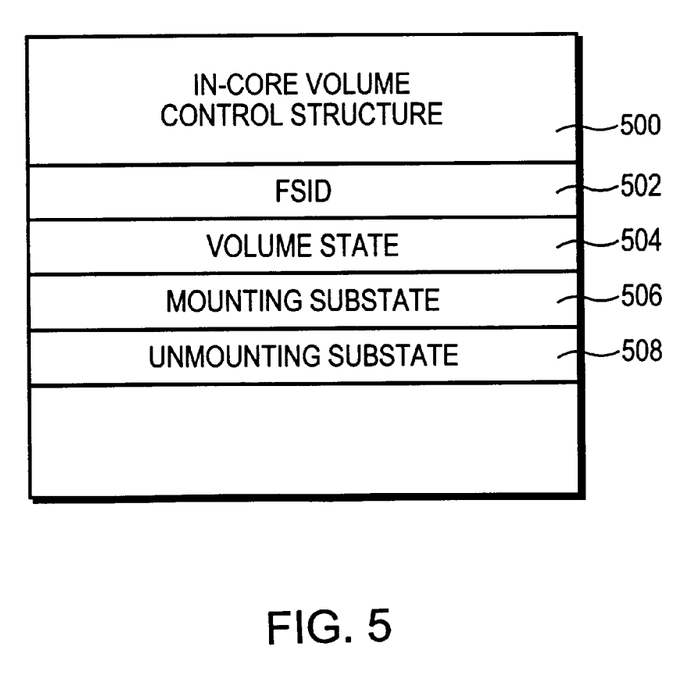
FIG. 5 is a simplified block diagram of the in-core volume control structure including sub-state information according to preferred embodiment of this invention.

There is also a separate in-core "volume control structure" for each volume. With reference to FIG. 5, this volume control structure 500 includes information needed to manage handling of the volume's storage at a file system level. Briefly, the information within the volume control structure 500 includes the file system identification (FSID) 502 that uniquely identifies the volume based upon a hashing or other acceptable technique. The volume control structure 500 stores the overall state 504 of the associated volume. Such states can include (but are not limited to) the following:

VOLUME UNMOUNTED, which indicates that the volume is unavailable for file system operations and is not in transition to any other state. Typically there is no volume control structure associated with an unmounted volume so this state is not retained in any volume control structure. An exception (in which the state is stored) can occur (a) when, early in the process of bringing a volume online, the volume's state is briefly set to VOLUME UNMOUNTED, and whence proceeds to the VOLUME MOUNTING state, and (b) for file system repair tools that allow certain messages to pass through the file system for verification purposes, and thereby requires recognition of the VOLUME UNMOUNTED;

VOLUME MOUNTED, which indicates that the volume is available for normal file system operations and is not in transition to any other state;

VOLUME FROZEN, which indicates that normal file system operations are suspended in order to keep the volume and its associated file system in a fixed state to allow certain maintenance operations to be performed which cannot be performed while normal file system operations are active. In one example, this state is used to by-pass the storage operating system and permit RAID to write directly to disk. In another example, it is used in conjunction with transfers that create volume mirrors on designated disk locations. Certain native requests are allowed in the VOLUME FROZEN state, such as requests to freeze a volume, request to take the volume out of this state (so-called "thaw" messages), and requests used to reload changed meta-data as part of the "thawing" process). Other requests are suspended, rather than rejected, until the frozen state changes.

VOLUME DESTROYING, which indicates that the volume in question is in the process of being destroyed that will result in the associated file system being forever unavailable for any subsequent use, and the disks within the volume being made available for re-use. Typically, any file system requests associated with an external protocol (NFS, CIFS and WEBNFS for example) are rejected during this state, while other native requests are allowed;

VOLUME CREATING, which indicates that the volume is in the process of being set up. Typically, any file system requests associated with an external protocol (NFS, CIFS and WEBNFS for example) are rejected during this state, while other native requests are allowed;

VOLUME MOUNTING, which is the transitional state when the volume in question is in the process of being mounted;

VOLUME UNMOUNTING, which is the transitional state when the volume in question is in the process of being unmounted;

NO VOLUME FSINFO, which is the state for a volume that cannot be accessed because the data necessary to find the file system state cannot be read. Typically, any file system requests associated with an external protocol (NFS, CIFS and WEBNFS for example) are rejected during this state, while other native requests are allowed;

VOLUME REPLAYING, which is the state employed when the volume is capable of executing file system requests, but is devoted to replaying the records in the NVRAM log pertaining to the file system. In this state the volume may not perform any new exogenous requests. In general, only messages used to replay the NVRAM log and messages that support replay (such as preloading of replay resources) are permitted in this state; and VOLUME REPLAYED, which is all records in the NVRAM log pertaining to the file system have been replayed, and the volume is being prepared for the execution of new exogenous file system requests. Native requests are permitted in this state.

Note that the volume states VOLUME FROZEN, VOLUME DESTROYING, VOLUME CREATING, and NO VOLUME FSINFO are generally unrelated to volume mounting/unmounting and are not further described.

D. Mounting and Unmounting Sub-States

Referring further to FIG. 5, the volume control structure 500, according to a preferred embodiment, also stores a mounting sub-state 506 or an unmounting sub-state 508 for the associated volume, or both. The mounting and unmounting sub-state, as applicable, defines a key point of progress within the overall mounting or unmounting procedure, respectively. The volume control structure 500 can store the sub-states in the form of variable values, field entries, flags that indicate the sub-state, either within the structure, referenced by the structure, or otherwise associated with the structure. Based upon this sub-state, certain file system requests are permitted or restricted, and other appropriate actions with respect to the file system and connected clients (such as CIFS based activities) will occur. According to FIG. 3, the file system layer 330 is provided with a state management function 370. This represents the recognition of the new sub-states by the storage operating system, and associated processes including, but not limited to, its CP process, and write allocator process. The storage operating system is thereby provided with a series of possible responses to different, known categories of file system requests based upon the current sub-state for the volume to which a request is directed (based upon the request's included FSID). These responses are defined below. They generally entail, allowing, restricting, or replying to the request.

When a volume is in the process of being mounted (i.e. is in the overall state (504) of VOLUME MOUNTING), the sub-state relating to mounting (506) is used to indicate the current state of the mounting process. The mounting state has one of the following values:

VOLUME MOUNTING_LOADING, which is the sub-state during which the volume's file system meta-data are read into memory and initialized. Only file system requests devoted to the reading of such meta-data may be processed when the volume is in this sub-state. In addition requests originating from storage operating system file system repair tools are allowed in this state. Other file system requests are rejected with an error indication;

VOLUME MOUNTING_INITIALIZING, which is the sub-state during which the handling of internal files needed for file system operation that are not part of file system meta-data (e.g. quota files) is initialized. Only certain native requests for performing such initialization may be processed when the volume is in this sub-state. Such allowed requests typically relate to reads of meta-data files. Other requests are rejected with an error indication; and VOLUME MOUNTING_FINAL, which is the sub-state used when file system initialization has been completed. The volume may, however, not be ready to respond to external file system requests, since the replay of records in the NVRAM log pertaining to the file system may be necessary.

According to an alternate embodiment, the volume states VOLUME REPLAYING and VOLUME REPLAYED can be represented as additional mounting sub-states within the VOLUME MOUNTING state of the overall state 504.

Similarly, when a volume is in the process of being unmounted (i.e. is in the overall state (504) VOLUME UNMOUNTING), the sub-state relating to unmounting is used to indicate the current state of the unmounting process. In a preferred embodiment, the unmounting sub-state has the following values:

VOLUME UNMOUNTING_PREPARE, which is the sub-state used when the volume is being prepared to be unmounted. All file system requests are handled normally. No changes to the state of the volume may be made other than those being performed as part of the unmounting process;

VOLUME UNMOUNTING_VOLUME REFERENCE DRAIN, which is the sub-state used during the part of the unmounting process that is devoted to the elimination of external references to the volume control structure. External volume references can originate from administrative application program interfaces (APIs), including, but not limited to snapshot-handling APIs and quota APIs. In addition, such volume references can originate from storage operating system console command processes, volume copy references, character-set translation management, file system administrative support routines and upgrade processing. Eliminating such references is necessary since the volume control structure and associated in-core data will be deallocated after the volume is taken off line. When the volume is in this sub-state no new external references may be permitted to the volume in question. All other file system requests are processed normally;

VOLUME UNMOUNTING_DRAIN, which is the sub-state used when draining all active file system requests from the volume. While in this sub-state requests whose processing has been started previously and suspended (due to temporary unavailability of some resource) are allowed to be restarted and processed to completion. New file system requests are rejected with an error code that cause (for example) NFS to fail to respond to the subject request. Native requests are processed normally in this sub-state. The volume may not leave this state until there are no pending suspended file system requests for this volume;

VOLUME UNMOUNTING_GIVEBACK DRAIN, which is a sub-state used when performing a giveback (e.g. return of filer volume(s) to a cluster partner filer). A volume remains in this sub-state until there are no suspended file system requests for this volume. In this sub-state, file system requests are processed normally, but the requests that are part of long-running activities are aborted. Since higher-level mechanisms, such as CIFS and NFS are closed-off, requests from these protocols are automatically excluded;

VOLUME UNMOUNTING_WAIT, which is the sub-state used when waiting for long-running activities to be terminated, and for all changes caused by previous file system operations to be written to disk. In this sub-state, new file system requests are rejected with an error code that causes (for example) NFS to not respond to the request in question. Most native requests are rejected in this sub-state. However, those required to effect the process of writing the file system state to disk (necessary to complete processing for this sub-state) are allowed to be processed; and VOLUME UNMOUNTING_FINAL, which is the sub-state used when all file system processing has been successfully quiesced. The only work remaining (before the volume is put in the state VOLUME UNMOUNTED) is to release the data structures devoted to storing the file system state. Most file system requests are rejected in this sub-state. Only native requests pertaining to data structure deallocation or to process CP operations are allowed.

E. Volume Mounting Procedure

Figure 6:
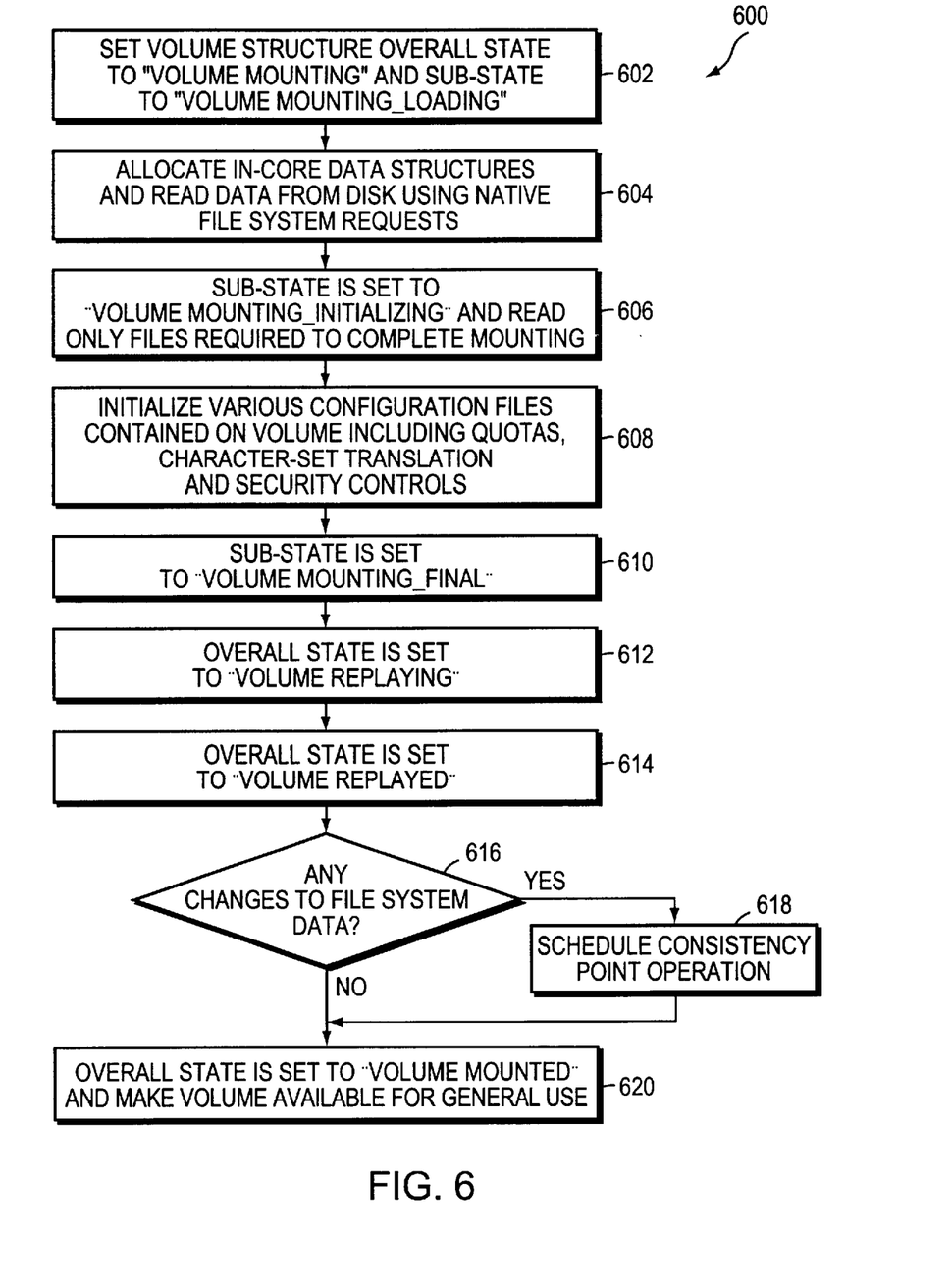
FIG. 6 is a flow diagram of a procedure for mounting an individual volume.
Figure 7:
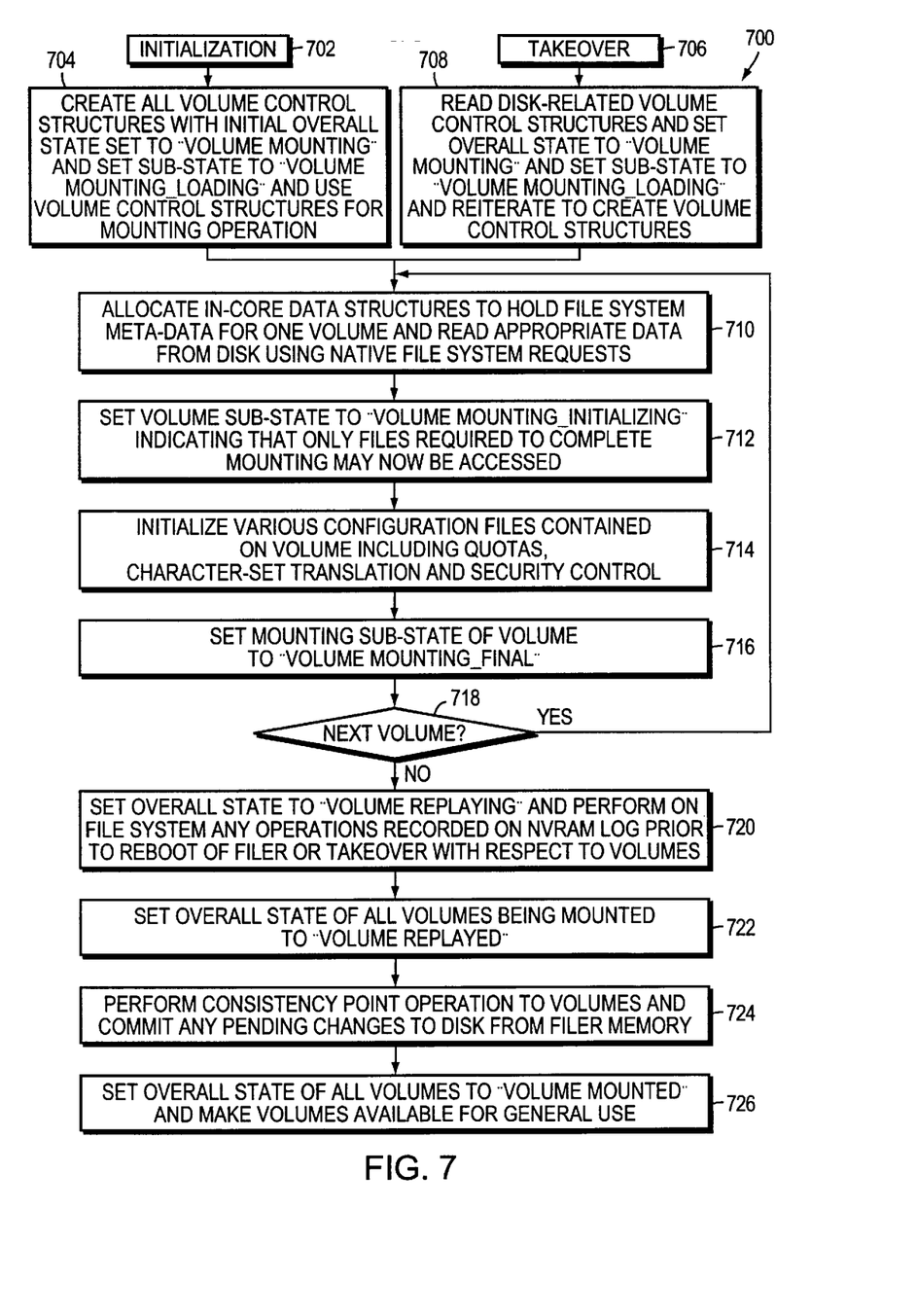
FIG. 7 is a flow diagram of a procedure for mounting a group of volumes after either a filer initialization or takeover.

Reference is now made to FIGS. 6 and 7, which, respectively, detail the volume-mounting procedure for individual volumes and a group of volumes, as performed by the storage operating system. In general, volumes are mounted individually using an operator-generated "volume online" command and as a group when the subject filer initializes itself, or when a filer's volumes are taken over by a cluster partner filer in view of the failure of the filer (e.g. failover).

Referring first to FIG. 6, the procedure 600 for mounting an individual volume is shown. The volume control structure for the volume has its overall state set to VOLUME MOUNTING and the associated sub-state set to VOLUME MOUNTING_LOADING (step 602). The in-core data structures within the filer memory are then allocated, and native requests are used to read the meta-data for the volume from the disks into the allocated data structures (step 604). The sub-state of the mounting volume is then set to VOLUME MOUNTING_INITIALIZING. This sub-state indicates to the file system that files may be accessed—but limited to the accessing/reading of volume files required to complete the mounting process (step 606).

Various aspects of the file system's processing functions are initialized using configuration files within the volume including quotas, character-set translation for international applicability and security control (step 608). The volumes mounting sub-state is then set to VOLUME MOUNTING_FINAL (step 610) and the overall volume state is set to VOLUME REPLAYING (step 612). In this state the file system is directed toward the replay of the records in the NVRAM log pertaining to the file system, and the volume may not perform any new exogenous requests. For example, exogenous requests should not be executed while the file system is directed to replaying requests from the NVRAM, since the requests being replayed, having already been performed and responded to (before reboot or failover) have, from the external point of view, already happened, thus making it incorrect to allow any later requests to execute, before the file system state has been brought up to date with the NVRAM.

In the case of mounting an individual volume, there will be no NVRAM entries associated with the volume which need to be replayed so the overall state is immediately set to VOLUME REPLAYED (step 614), which is the state in which all records pertaining to the file system in the NVRAM log have been replayed, and the volume is being prepared for the execution of new exogenous file system requests. The volume may not perform any new exogenous requests at this time. Finally, the system determines whether any changes have been made to file system data based upon the mounting process thus far (decision step 616). If changes have been made then a consistency point operation which commits NVRAM log requests to disk is scheduled (step 618). The procedure 600 then completes with the overall state for the mounted volume set to VOLUME MOUNTED, wherein the file system is informed that the volume is then available for general use (step 620). This state is maintained in the volume's volume control structure so long as it remains available (e.g. until takeover, giveback or unmount).

Referring now to FIG. 7, the procedure 700 for mounting a group of volumes after either a filer initialization (reboot) or takeover is shown. Each procedure requires a replay of the appropriate NVRAM log (either the subject filer in boot-up, or the cluster partner filer in takeover). Upon initialization (step 702), the volume control structures for all volumes to be mounted are created, and the initial overall state is set to VOLUME MOUNTING, and the mounting sub-state is set to VOLUME MOUNTING_LOADING, indicating to the file system that only file system requests devoted to the reading of meta-data from disk may be processed, while other file system requests are rejected with an error indication (step 704).

In the case of a takeover operation (step 706), the volumes transition through the same sub-states described above for the volumes being taken over. In takeover, the disk-related volume control structure are read, setting the overall state to VOLUME MOUNTING and the sub-state to VOLUME MOUNTING_LOADING, and those read-in structures are reiterated within THE FILE SYSTEM to determine the set of volumes to be acted-upon (step 708). This set is then processed in the further mounting process.

In both initialization and takeover, the in-core data structures to hold file system meta-data for each volume are, in turn, allocated. Internal file system requests are used to then read the data from disk into the in-core, allocated structure (step 710) and the volume sub-state is set to VOLUME MOUNTING_INITIALIZING (step 712), thereby limiting access to files only required to complete mounting. Next, various configuration files on the volume are initialized, including quotas, character-set translations and security control (step 714). The mounting sub-state of the volume is then set to VOLUME MOUNTING_FINAL, indicating that file system initialization or takeover has been completed. The volume may, however, not be ready to respond to external file system requests, since the replay of records pertaining to the file system in the NVRAM log may be necessary. The above steps 710–718 are performed for each volume in the mounting group until all attain the VOLUME MOUNTING_FINAL sub-state, at which time the procedure branches to step 720, and the overall state for all volumes is set to VOLUME REPLAYING. At this time the NVRAM log which contains entries with respect to the volumes in the group is replayed, and any file system operations recorded therein prior to reboot or takeover are performed.

The overall state for all volumes in the mounting group is then set to VOLUME REPLAYED (step 722), and the volumes are prepared for the execution of new exogenous file system requests, while the volumes may not perform any new exogenous requests at this time. Next, the file system performs a consistency point operation, committing any pending changes in the volumes to disk from the filer memory (step 724). Finally, the overall state for all mounted volumes is set to VOLUME MOUNTED indicating to the file system that the volumes are available for general use (step 726).

Figure 8:
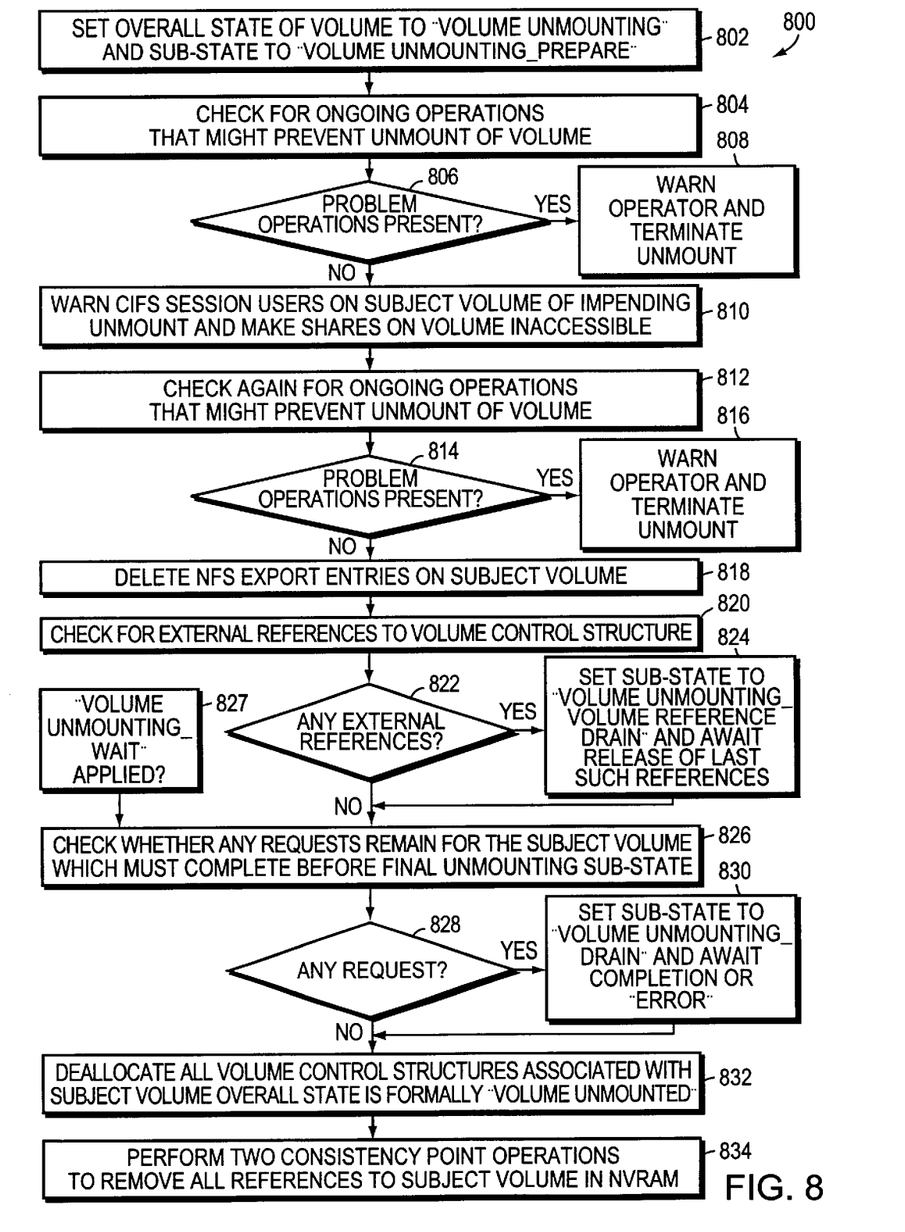
FIG. 8 is a flow diagram of a procedure for unmounting an individual volume.
Figure 9:
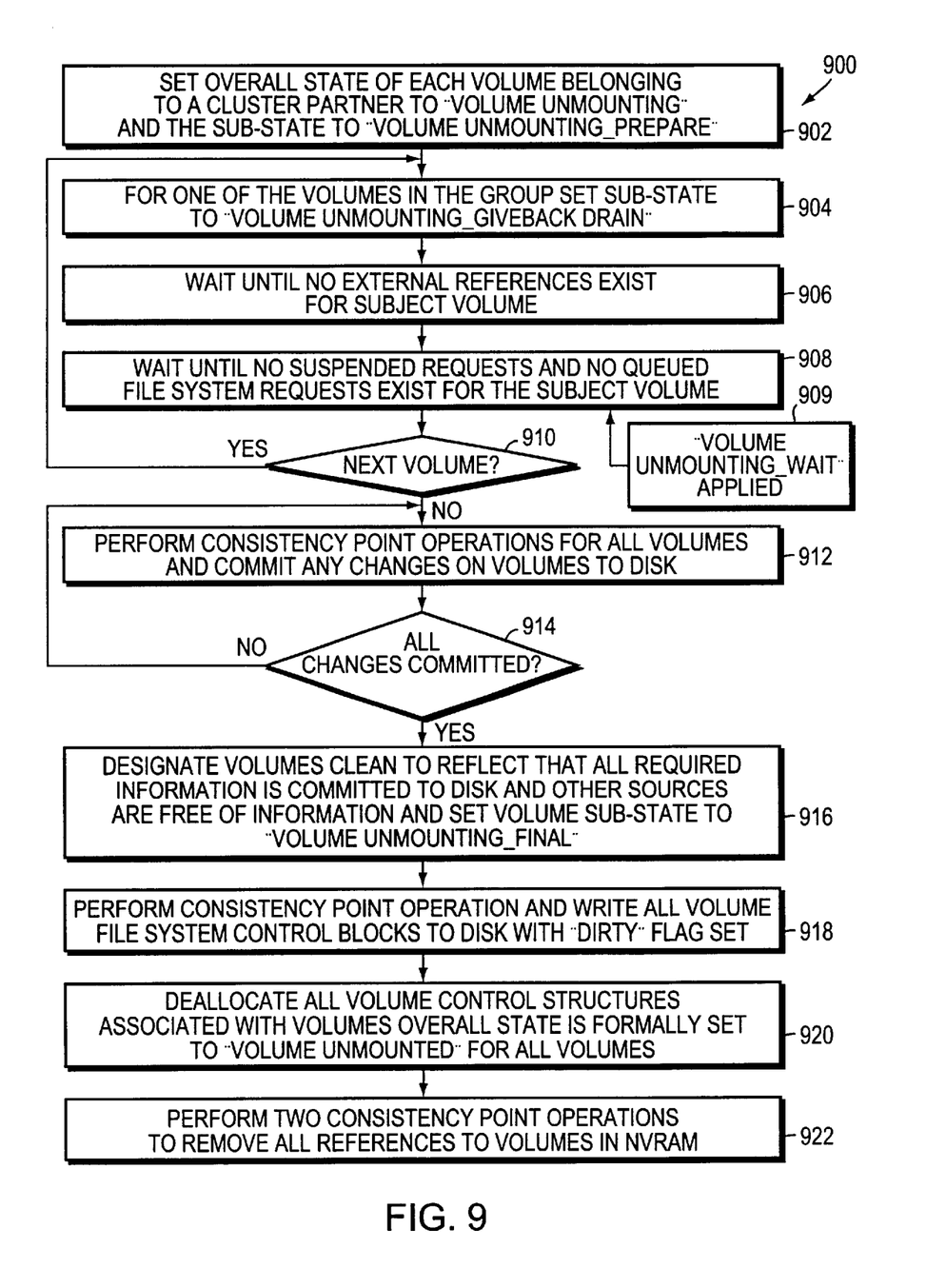
FIG. 9 is a flow diagram of a procedure for unmounting volumes as part of a give-back from a cluster partner filer.

Reference is now made to FIGS. 8 and 9, which, respectively, detail the volume-unmounting procedure for individual volumes and a group of volumes. In general, volumes are unmounted individually using an operator-generated "volume offline" command. Alternatively, volumes can be unmounted as a group when multiple volumes belonging to a filer are returned from a cluster partner in a giveback process once the volume-owning filer is restored.

F. Volume Unmounting Procedure

Referring now to FIG. 8, the procedure 800 for unmounting an individual volume, as performed by the storage operating system, is shown. The volume control structure of the volume has its overall state set to VOLUME UNMOUNTING and the associated sub-state set to VOLUME UNMOUNTING_PREPARE (step 802). This sub-state indicates to the file system that the volume is being prepared to be unmounted. All file system requests are handled normally. No changes to the state of the volume may be made other than those being performed as part of the unmounting process. The file system then checks whether any ongoing operations that might prevent an unmount operation are still in progress (step 804). At this time the unmounting operation is not irrevocable. Accordingly, if any unwanted operations are discovered (decision step 806), then the unmounting operation is terminated, and the operator is warned of the condition (step 808). If no interfering operations are noted, then the procedure 800 warns all CIFS sessions/users involving shares on the subject volume. The shares are then made inaccessible (step 810).

The file system then, again, checks whether any ongoing operations would interfere with unmount (step 812), and if any exist (decision step 814), the operator is warned and the procedure terminates (step 816). If no interfering operations are discovered, then the unmounting procedure becomes irrevocable, and the file system deletes NFS export entries on the subject volume (step 818). The file system then checks for any external references to the subject volume control structure (step 820). If any external references are discovered (decision step 822), then the unmounting sub-state is set to VOLUME UNMOUNTING_VOLUME REFERENCE DRAIN, in which the system awaits release of all remaining external references to the volume (step 824). When the volume is in this sub-state no new external references may be created to the volume in question. All other permitted file system requests (including those for the subject volume that are not otherwise barred by, for example, NFS and CIFS cutoff) are processed normally.

If (or when) no external references remain the procedure 800 branches (via step 824 and/or decision step 822) to step 826, in which the file system checks for any file system requests that must complete before advancing to the final unmounting state (step 826). Such requests may include suspended requests or requests in an input queue relating to the subject volume. If any zombie processes or other long-term processes are active with respect to the volume, the state is set to VOLUME UNMOUNTING_WAIT, (step 827) causing the unmount to await termination of the long-term process. If there still exist any other suspended or queued requests (decision step 828), then the unmounting sub-state is set to VOLUME UNMOUNTING_DRAIN (step 830). When requests are completed, or an error is noted, the procedure 800 branches to the final stage in which no new requests to the subject volume are permitted.

At this time, all volume control structures related to the volume are eliminated from the file system and the "formal" state of the volume is set to VOLUME UNMOUNTED (step 832). As referenced above, the elimination of the data structure, for the most part, removes any reference to the volume, and its state is, therefore, generally irrelevant to the file system (except for certain specialized operations). Finally two consecutive consistency point operations are performed (step 834). This ensures that no reference to the volume remains in the NVRAM, since each consistency point clears one half of the total NVRAM log. In the meantime, the FINAL sub-state ensures that no new references/requests can be entered into either half of the log. Any subsequent attempt to access the volume by the system or a user will simply result in an error message returned to the user stating that the volume no longer exists.

Referring now to FIG. 9, the procedure 900 for unmounting a group of volumes, typically as part of a giveback of volumes to an owning filer from a cluster partner filer.

First, the overall state for each volume belonging to the cluster partner filer's giveback group is set to VOLUME UNMOUNTING and the unmounting sub-state is set to VOLUME UNMOUNTING_PREPARE (step 902). As previously described, all file system requests are handled normally. No changes to the state of the volume may be made other than those being performed as part of the unmounting process.

Then, for each volume of the giveback group, in turn, the file system sets the unmounting sub-state to VOLUME UNMOUNTING_GIVEBACK DRAIN (step 904). A volume remains in this sub-state until there are no suspended file system requests for this volume. In this sub-state, file system requests are processed normally, but long-term processes, such as the deletion or deallocation of disk blocks for large deleted or truncated files (e.g. "zombie processing," described above), are aborted. The file system also checks whether any external references for a subject volume exist, and awaits draining of these external references through processing thereof (step 906). In addition, the file system searches for any suspended requests and queued file system requests with respect to the subject volume, and awaits completion of these requests (step 908). If any zombie processing, or other long-term processes are occurring with respect to the volume, the state VOLUME UNMOUNTING_WAIT is entered (step 909), and the system awaits termination of the process. Steps 904–909 continue on each volume of the giveback set in turn until all volumes are drained, at which time the procedure 900 branches (via decision step 910) to consistency point step 912. At this time, the file system performs a series of consistency point operations, committing any changed data (in filer memory, and not yet reflected on disk) with respect to the giveback volumes to disk. Consistency point operations continue until any and all changes to data in filer memory have been accounted for and committed to disk (decision step 914).

In accordance with step 916, the giveback volumes are then designated "clean" to reflect that all required information is present on disk and that none must be sought from any other source such as a non-volatile memory or separate on-board disk assembly. Once the volume reaches this sub-state, it may no longer have pending changes that must be committed to disk. In other words, the last change to the volume must have already occurred.

Another consistency point operation is then performed (step 918), which results in the writing of the new on-disk FS control block (400) of all giveback volumes to disk, with the dirty flag reset. Following this writing, the in-core data and volume control structures for all giveback volumes are deallocated, in turn, completing the unmounting process. The formal state of the unmounted volumes is set to VOLUME UNMOUNTED (step 920).

Finally, two consistency point operations are performed (step 922), thereby removing all remaining references/requests related to the deallocated volumes from the two halves of the NVRAM, as described generally above.

The foregoing has been a detailed description of a preferred embodiment of the invention. Various modifications and additions can be made without departing from the spirit and scope of the invention. For example, the number of clustered filers interconnected in a takeover and giveback implementation can vary, the arrangement of disks within a volume can vary. While a particular file system is described, it is expressly contemplated that any file system capable of managing disk storage may be substituted. In addition, the particular volume states and sub-states may be freely adapted to the details of the file system's operation, allowing certain processes to occur, and others to be rejected as needed to effect mount and unmount at various sub-states within the overall mounting and unmounting states, respectively. Further, the use of Data ONTAP and WAFL in the description herein is exemplary only, and other storage operating systems can implement the invention. Similarly, the use of an NVRAM to provide backup functions is exemplary and other backup and fault-tolerant mechanisms (if any) can be employed. Finally, it is expressly contemplated that any or all of the architecture, processes and data structures described above can be implemented in hardware, firmware or software comprising a computer-readable medium consisting of program instructions executing on a computer, or any combination of hardware, firmware and/or software. Accordingly, this description is meant to be taken only by way of example, and not to otherwise limit the scope of this invention.

What is claimed is:

1. A system for mounting and unmounting storage volumes attached to a storage system including a file system for manipulating storage volumes, the system comprising:

a mechanism in the storage operating system for defining, in a respective file system volume control structure for at least one of the volumes, a plurality of mounting and unmounting sub-states; and wherein the storage operating system is adapted to respond to each of the sub-states by either permitting needed file system operations or restricting predetermined exogenous file system operations with respect to the one of the volumes based upon a respective value of each of the sub-states.

2. The system as set forth in claim 1 wherein the sub-states define VOLUME MOUNTING sub-states and VOLUME UNMOUNTING sub-states, the volume control structure including an overall state that includes the VOLUME MOUNTING and the VOLUME UNMOUNTING state and one of the sub-states.

3. The system as set forth in claim 1 wherein the storage system includes each of a first cluster partner filer and a second cluster partner filer interconnected to the first cluster partner filer, and the first cluster partner filer owns the one of the volumes, and the file system is adapted to perform an unmount procedure of the one of the volumes based upon a giveback of the one of the volumes from the second cluster partner filer to the first cluster partner filer.

4. The system as set forth in claim 1 wherein the storage system includes each of a first cluster partner filer and a second cluster partner filer interconnected to the first cluster partner filer, and the first cluster partner owns the one of the volumes, and the file system is adapted to perform a mount procedure of the one of the volumes based upon a takeover of the one of the volumes by the second cluster partner filer from the first cluster partner filer.

5. A system for mounting and unmounting storage volumes attached to a storage system including a file system for manipulating storage volumes, the system comprising:

a mechanism in the storage operating system for defining, in a respective file system volume control structure for at least one of the volumes, a plurality of mounting and unmounting sub-states; and a storage operating system, the storage operating system adapted to respond to each of the sub-states by either permitting needed file system operations or restricting predetermined exogenous file system operations with respect to the one of the volumes based upon a respective value of each of the sub-states;

VOLUME MOUNTING sub-states and VOLUME UNMOUNTING sub-states, the volume control structure including an overall state that includes the VOLUME MOUNTING and the VOLUME UNMOUNTING state and one of the sub-states, and the VOLUME MOUNTING sub-states include;

(a) LOADING, wherein file system operations comprising file system requests for reading meta-data from the volume are permitted and other file system requests are rejected with respect to the one of the volumes;

(b) INITIALIZING, wherein internal files needed for a file system operation other than meta-data are read, and other file system requests are rejected with respect to the one of the volumes; and (c) FINAL, wherein the one of the volumes is initialized and predetermined file system operations are required and other requests are rejected with respect to the one of the volumes.

6. The system as set forth in claim 5 wherein the predetermined file system operations include replaying a nonvolatile memory log of requests with respect to the one of the volumes.

7. A system for mounting and unmounting storage volumes attached to a storage system including a file system for manipulating storage volumes, the system comprising:

a mechanism in the storage operating system for defining, in a respective file system volume control structure for at least one of the volumes, a plurality of mounting and unmounting sub-states; and a storage operating system, the storage operating system adapted to respond to each of the sub-states by either permitting needed file system operations or restricting predetermined exogenous file system operations with respect to the one of the volumes based upon a respective value of each of the sub-states;

VOLUME MOUNTING sub-states and VOLUME UNMOUNTING sub-states, the volume control structure including an overall state that includes the VOLUME MOUNTING and the VOLUME UNMOUNTING state and one of the sub-states, and the VOLUME UNMOUNTING sub-states include;

(a) PREPARE, wherein all file system requests are handled normally, but no changes to data of the one of the volumes is permitted other than a change required to unmount the volume;

(b) DRAIN, wherein any external procedure referencing the one of the volumes and any active file system request with respect to the one of the volumes are completed and no new external file system requests are permitted; and (c) FINAL, wherein data structures in the file system with respect to the one of the volumes are released.

8. The system as set forth in claim 7 wherein, the file system is adapted to perform, based upon the FINAL sub-state, a consistency point operation to clear remaining requests with respect to the one of the volumes from a nonvolatile memory log adapted to store requests with respect to the one of the volumes.

9. A method for mounting and unmounting storage volumes attached to a storage system including a file system for manipulating storage volumes, the system comprising:

defining in a respective file system volume control structure for at least one of the volumes a plurality of mounting and unmounting sub-states; and responding to each of the sub-states by either permitting needed file system operations or restricting predetermined exogenous file system operations with respect the one of the volumes based upon a respective value of each of the sub-states.

10. The method as set forth in claim 9 further comprising defining the sub-states as VOLUME MOUNTING sub-states and VOLUME UNMOUNTING sub-states, the file system volume control structure including an overall state that includes the VOLUME MOUNTING and the VOLUME UNMOUNTING state and one of the sub-states.

11. A method for mounting and unmounting storage volumes attached to a storage system including a file system for manipulating storage volumes, the system comprising:

defining in a respective file system volume control structure for at least one of the volumes a plurality of mounting and unmounting sub-states;

responding to each of the sub-states by either permitting needed file system operations or restricting predetermined exogenous file system operations with respect the one of the volumes based upon a respective value of each of the sub-states;

defining the sub-states as VOLUME MOUNTING sub-states and VOLUME UNMOUNTING sub-states, the file system volume control structure including an overall state that includes the VOLUME MOUNTING and the VOLUME UNMOUNTING state and one of the sub-states;

defining the VOLUME MOUNTING sub-states as, (a) LOADING, wherein file system operations comprising file system requests for reading meta-data from the on-disk volume control structure are permitted and other file system requests are rejected with respect to the one of the volumes;

(b) INITIALIZING, wherein internal files needed for a file system operation other than meta-data are read, and other file system requests are rejected with respect to the one of the volumes; and (c) FINAL, wherein the one of the volumes is initialized and predetermined file system operations are required and other requests are rejected with respect to the one of the volumes.

12. The method as set forth in claim 11 wherein the predetermined file system operations include replaying a nonvolatile memory log of requests with respect to the one of the volumes.

13. A method for mounting and unmounting storage volumes attached to a storage system including a file system for manipulating storage volumes, the system comprising:

defining in a respective file system volume control structure for at least one of the volumes a plurality of mounting and unmounting sub-states;

responding to each of the sub-states by either permitting needed file system operations or restricting predetermined exogenous file system operations with respect the one of the volumes based upon a respective value of each of the sub-states;

defining the sub-states as VOLUME MOUNTING sub-states and VOLUME UNMOUNTING sub-states, the file system volume control structure including an overall state that includes the VOLUME MOUNTING and the VOLUME UNMOUNTING state and one of the sub-states;

defining the VOLUME UNMOUNTING sub-states as, (a) PREPARE, wherein all file system requests are handled normally, but no changes to data of the one of the volumes is permitted other than a change required to unmount the volume;

(b) DRAIN, wherein any external procedure referencing the one of the volumes and any active file system request with respect to the one of the volumes are completed and no new external file system requests are permitted; and (c) FINAL, wherein data structures in the file system with respect to the one of the volumes are released.

14. The method as set forth in claim 13 further comprising performing, based upon the FINAL sub-state, a consistency point operation to clear remaining requests with respect to the one of the volumes from a nonvolatile memory log adapted to store requests with respect to the one of the volumes.

15. A computer-readable medium including program instructions executing on a computer for mounting and unmounting storage volumes attached to a storage system including a file system for manipulating storage volumes, the program instructions performing the steps of:

defining in a respective file system file system volume control structure for at least one of the volumes a plurality of mounting and unmounting sub-states; and responding to each of the sub-states by either permitting needed file system operations or restricting predetermined exogenous file system operations with respect the one of the volumes based upon a respective value of each of the sub-states.

16. The computer-readable medium as set forth in claim 15 further comprising program instructions for defining the sub-states as VOLUME MOUNTING sub-states and VOLUME UNMOUNTING sub-states, the file system volume control structure including an overall state that includes the VOLUME MOUNTING and the VOLUME UNMOUNTING state and one of the sub-states.

17. A system for mounting and unmounting storage volumes attached to a storage system including a file system for manipulating storage volumes, the system comprising:
   means for defining in a respective file system volume control structure for at least one of the volumes a plurality of mounting and unmounting sub-states; and
   means for responding to each of the sub-states including means for either permitting needed file system operations or restricting predetermined exogenous file system operations with respect to the one of the volumes based upon a respective value of each of the sub-states.

18. A method for gracefully mounting and unmounting a storage volume managed by a storage system comprising the steps of:
   tracking, with a storage operating system, a mounting sub-state or an unmounting sub-state in a control structure of the storage volume during either of a volume mounting process or volume unmounting process, respectively; and
   selectively permitting and restricting transaction requests directed to the storage operating based upon a value of the mounting sub-state or the unmounting sub-state.

19. The method as set forth in claim 18 wherein the step of selectively permitting and restricting includes permitting native requests that originate in a file system of the storage operating system and restricting exogenous requests that are received from clients on the network or that are generated outside of the file system.

20. The method as set forth in claim 19 wherein the step of selectively permitting and restricting includes restricting exogenous procedures including long-running maintenance procedures generated outside the file system.

21. The method as set forth in claim 19 wherein the step of permitting includes permitting only native requests required to complete either of the mounting or the unmounting in response a predetermined value of the mounting sub-state or the unmounting sub-state, respectively.

22. A volume control structure for a volume managed by a storage operating system and an associated file system component of the storage operating system, the volume control structure identifying the storage volume and comprising:
   a mounting sub-state that is adapted to be tracked by the file system component during a mounting process of the volume so as to selectively permit or restrict transaction requests based upon a tracked value of the mounting sub-state; and
   an unmounting sub-state that is adapted to be tracked by the file system component during an unmounting process of the volume so as to selectively permit or restrict transaction requests based upon a tracked value of the unmounting sub-state.

23. The volume control structure as set forth in claim 22 wherein the file system component is adapted to selectively permit native requests that originate in a file system of the storage operating system and restrict exogenous requests that are received from clients on the network or that are generated outside of the file system.

24. The volume control structure as set forth in claim 23 wherein the file system is adapted to permit only native requests required to complete either of the mounting process or the unmounting process in response a predetermined tracked value of the mounting sub-state or the unmounting sub-state, respectively.

* * * * *